(12) United States Patent
O'Sullivan et al.

(10) Patent No.: US 10,231,504 B2
(45) Date of Patent: Mar. 19, 2019

(54) ARTICLES OF APPAREL INCLUDING ENCAPSULATED INSULATION PANELS AND METHODS OF MAKING THE SAME

(71) Applicant: Reebok International Limited, London (GB)

(72) Inventors: Patrick Schuller O'Sullivan, Cambridge, MA (US); Emily Stableford, Boston, MA (US)

(73) Assignee: Reebok International Limited, London (GB)

( * ) Notice: Subject to any disclaimer, the term of this patent is extended or adjusted under 35 U.S.C. 154(b) by 0 days.

(21) Appl. No.: 15/996,317

(22) Filed: Jun. 1, 2018

(65) Prior Publication Data

US 2018/0271204 A1 Sep. 27, 2018

Related U.S. Application Data

(62) Division of application No. 14/881,748, filed on Oct. 13, 2015, now Pat. No. 9,999,267.

(51) Int. Cl.
*A41B 13/04* (2006.01)
*B32B 3/00* (2006.01)
(Continued)

(52) U.S. Cl.
CPC ............... *A43B 3/00* (2013.01); *B32B 37/06* (2013.01); *B32B 37/10* (2013.01); *B32B 37/12* (2013.01);
(Continued)

(58) Field of Classification Search
CPC . B32B 2437/00; B32B 3/266; B32B 2305/18; B32B 2307/304; B32B 37/0076;
(Continued)

(56) References Cited

U.S. PATENT DOCUMENTS 4,262,046 A * 4/1981 Eitel .................... A41D 31/005
428/69
2005/0144696 A1* 7/2005 Lack .................. A41D 31/0038
2/69

(Continued)

OTHER PUBLICATIONS

McCoy, Sean, "Could 'Aerogel' Create Thinnest, Warmest Jacket Ever?" Mar. 25, 2015, < http://gearjunkie.com/lukla-endeavour-aerogel-jacket>, accessed on Oct. 9, 2015.
(Continued)

*Primary Examiner* — Philip C Tucker
*Assistant Examiner* — Brian R Slawski
(74) *Attorney, Agent, or Firm* — Sterne, Kessler, Goldstein & Fox P.L.L.C.

(57) ABSTRACT

Articles of apparel including an encapsulated insulation panel with a plurality of spaced apart insulation sections, methods of making the encapsulated insulation panels, and methods of making the articles of appeal are provided. Methods of making articles of apparel may include bonding an encapsulated insulation panel to a first fabric layer with an adhesive film. Methods of making articles of apparel may also include coupling the encapsulated insulation panel to a second fabric layer with an adhesive tape to form a multi-layer fabric. The bonding and coupling of an encapsulated insulation panel to the fabric layers may be performed with using one or more presses.

20 Claims, 8 Drawing Sheets

(51) Int. Cl.
 B65B 11/00 (2006.01)
 B29C 65/00 (2006.01)
 B32B 7/14 (2006.01)
 B32B 37/00 (2006.01)
 A43B 3/00 (2006.01)
 B32B 37/12 (2006.01)
 B32B 37/14 (2006.01)
 B32B 37/06 (2006.01)
 B32B 37/10 (2006.01)
 B32B 38/06 (2006.01)
 B32B 37/26 (2006.01)

(52) U.S. Cl.
 CPC .............. *B32B 37/14* (2013.01); *B32B 38/06* (2013.01); *A41D 2400/10* (2013.01); *B32B 37/26* (2013.01); *B32B 2037/268* (2013.01); *B32B 2305/18* (2013.01); *B32B 2405/00* (2013.01); *B32B 2437/00* (2013.01)

(58) Field of Classification Search
 CPC ................ B32B 37/02; B32B 37/1207; B32B 2037/1223; B32B 2037/123; A41D 31/0038; B29C 65/02; B29C 65/18; B29C 65/48; B29C 65/4815; B29C 65/486; B29C 65/50; B29C 65/5042; B29C 65/5057
 USPC ......... 156/60, 65, 68, 70, 72, 145, 146, 147, 156/250, 251, 252, 285, 286, 290, 291, 156/292, 295, 297, 299, 300, 305, 306.6, 156/308.2, 308.4, 309.6; 2/456, 458, 2/2.11, 2.14, 2.15, 2.16, 85, 93, 102
 See application file for complete search history.

(56) References Cited

U.S. PATENT DOCUMENTS

| | | |
|---|---|---|
| 2006/0024469 A1 | 2/2006 | Tenra et al. |
| 2006/0046024 A1 | 3/2006 | Huntley |
| 2006/0253964 A1* | 11/2006 | Dennis ............... A42B 3/12 2/414 |
| 2007/0224390 A1 | 9/2007 | McCormick |
| 2010/0129573 A1 | 5/2010 | Kim |
| 2010/0186134 A1* | 7/2010 | Hunter ............... A45F 3/04 2/2.5 |
| 2012/0291946 A1 | 11/2012 | Turner |
| 2013/0212771 A1 | 8/2013 | McFarlane |

OTHER PUBLICATIONS

Faction Franklin Aerogel Jacket <http://www.evo.com/insulated-jackets/faction-franklin-aerogel-jacket.aspx#image=96076/404129/faction-franklin-aerogel-jacket-loden-green.jpg>, accessed on Oct. 9, 2015.
Lukla Endeavor—Outerwear for the 21$^{st}$ Century Adventurer https://www.kickstarter.com/projects/1338531979/lukla-endeavour-outerwear-for-the-21st-century-adv, accessed Oct. 9, 2015.
Faction Aerogel Insulation <http://www.factionskis.com/collections/aerogel-insulation>, accessed Oct. 9, 2015.

* cited by examiner

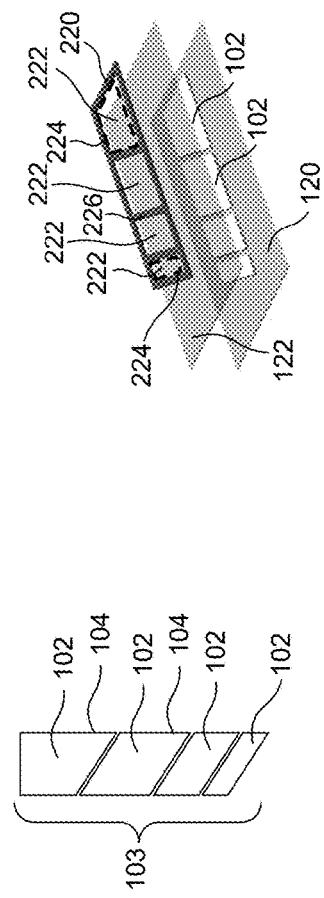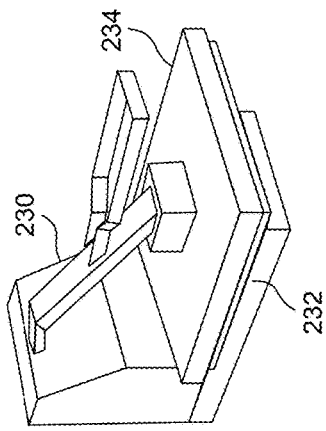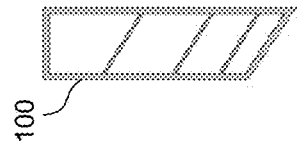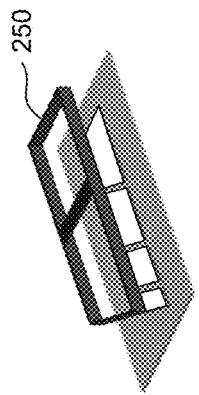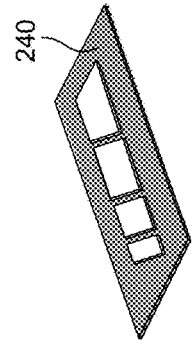
FIG. 3A  FIG. 3B  FIG. 3C  FIG. 3D  FIG. 3E  FIG. 3F

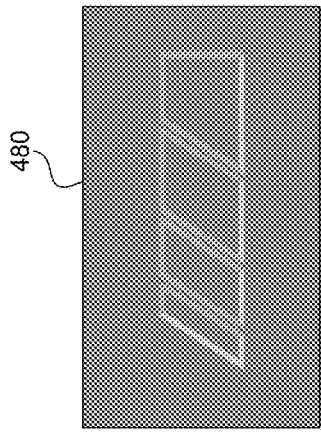
FIG. 5C
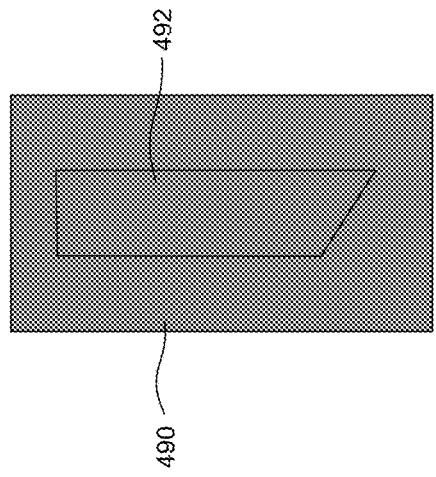
FIG. 5E
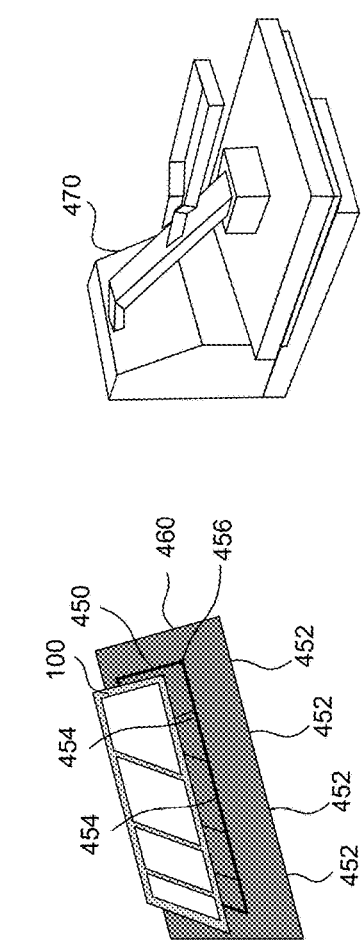
FIG. 5A
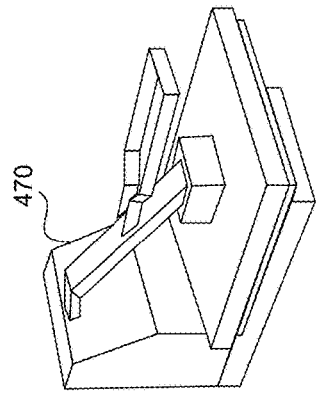
FIG. 5D
FIG. 5B

ARTICLES OF APPAREL INCLUDING ENCAPSULATED INSULATION PANELS AND METHODS OF MAKING THE SAME

CROSS-REFERENCE TO RELATED APPLICATIONS

This application is a divisional of and claims priority to U.S. application Ser. No. 14/881,748, filed Oct. 13, 2015, now U.S. Pat. No. 9,999,267, which is incorporated herein by reference in its entirety.

FIELD

The described embodiments generally relate to articles of apparel including encapsulated insulation panels. In particular, embodiments relate to articles of apparel including encapsulated insulation panels made with an aerogel insulation material and methods of making articles of apparel with the encapsulated insulation panels.

BACKGROUND

Insulation for an article of apparel protects a wearer from the effects of cold weather and keeps a wearer warm. The amount and location of insulation on an article of apparel may provide a desired amount of insulative properties for an article of apparel. But, insulation also adds weight and volume to an article of apparel, which in some cases may be undesirable. Therefore, a continuing need exists for innovations in insulation for apparel and methods of making insulation for apparel.

BRIEF SUMMARY OF THE INVENTION

Some embodiments are directed to a method of making an article of apparel, the method including bonding an encapsulated insulation panel to a first fabric layer with an adhesive film, the encapsulated insulation panel including a plurality of insulation sections arranged in a spaced apart configuration and encapsulated between a first polymeric film and second polymeric film, and the adhesive film having a plurality of openings corresponding to the exterior shapes of the plurality of insulation sections; coupling the encapsulated insulation panel to a second fabric layer with an adhesive tape, the adhesive tape being disposed over an outer perimeter of the encapsulated insulation panel, thereby forming a multilayer fabric; and forming an article of apparel including the multilayer fabric.

In some embodiments, the multi the multilayer fabric may be a fabric sheet used to form a portion of an article of apparel. In some embodiments, the multilayer fabric may be formed on a partially completed article of apparel.

In some embodiments, each insulation section may include an aerogel material. In some embodiments, the aerogel material may include a fibrous sheet of aerogel material.

In some embodiments, an encapsulated insulation panel may be made by a process including disposing a plurality of insulation sections over a first polymeric film in a spaced apart configuration, each insulation section including an aerogel material; disposing a second polymeric film over of the insulation sections such that the insulation sections are positioned between the first polymeric film and the second polymeric film; disposing a template over the second polymeric film, the template having openings corresponding to the exterior shapes of the insulation sections, and the template configured to arrange the insulation sections between the first polymeric film and the second polymeric film; disposing the insulation sections, polymeric films, and the template in a heat press; and heat sealing the first polymeric film to the second polymeric film, thereby forming the encapsulated insulation panel.

In some embodiments, the adhesive film may include a heat seal film, and bonding an encapsulated insulation panel to a first fabric layer may include heat sealing the encapsulated insulation panel to the first fabric layer with the adhesive film under pressure. In some embodiments, pressure may be applied via a heat press. In some embodiments, pressure may be applied by pulling a vacuum.

In some embodiments, bonding an encapsulated insulation panel to a first fabric layer includes disposing a polymeric pad over a first press plate of a press; disposing the first fabric layer over the polymeric pad; disposing an adhesive film over the first fabric layer; disposing the encapsulated insulation panel including a plurality of insulation sections over the adhesive film; disposing a polymeric sheet over the encapsulated insulation panel; and pressing the polymeric pad, the first fabric layer, the adhesive film, the encapsulated insulation panel, and the polymeric sheet between a second press plate of the press and the first press plate.

In some embodiments, bonding an encapsulated insulation panel to a first fabric layer includes pulling a vacuum between a polymeric pad and a polymeric sheet. In some embodiments, bonding an encapsulated insulation panel to a first fabric layer creates an embossed fabric.

In some embodiments, coupling an encapsulated insulation panel to a second fabric layer includes disposing a polymeric pad over a first press plate of a press; disposing the encapsulated insulation panel bonded to a first fabric layer over the polymeric pad; disposing the second fabric layer over the encapsulated insulation panel bonded to the first fabric layer; disposing an adhesive tape over a perimeter of the second fabric layer such that it overlaps the first fabric layer and the second fabric layer; disposing a polymeric sheet over the second fabric layer and the adhesive tape; and pressing the polymeric pad, the encapsulated insulation panel bonded to the first fabric layer, the second fabric layer, the adhesive tape, and the polymeric sheet between a second press plate and the first press plate.

Some embodiments are directed towards a method of making apparel insulation including an encapsulated insulation panel, the method including disposing a plurality of insulation sections over a first polymeric film in a spaced apart configuration, each insulation section including an aerogel material; disposing a second polymeric film over of the insulation sections such that the insulation sections are positioned between the first polymeric film and the second polymeric film; disposing a template over the second polymeric film, the template including openings corresponding to the exterior shape of the insulation sections, and the template configured to arrange the insulation sections between the first polymeric film and the second polymeric film; disposing the insulation sections, polymeric films, and the template in a heat press; and heat sealing the first polymeric film to the second polymeric film, thereby forming an encapsulated insulation panel.

In some embodiments, the aerogel material may include a fibrous sheet of aerogel material.

In some embodiments, the first polymeric film and a second polymeric film may be heat sealed together between a plurality of spaced apart insulation sections.

In some embodiments, the template may include a metallic material.

In some embodiments, excess film material may be cut from a perimeter of an encapsulated insulation panel.

In some embodiments, the heat press may be a flat press.

Some embodiments are directed towards an article of apparel including an encapsulated insulation panel having a plurality of insulation sections in a spaced apart configuration and encapsulated between two polymeric films, each insulation section including an aerogel material, a first fabric layer bonded to a first side of the encapsulated insulation panel with an adhesive film including a plurality of openings corresponding to the exterior shapes of the plurality of insulation sections, a second fabric layer coupled to a second side of the encapsulated insulation panel, where the first fabric layer includes an embossed exterior surface corresponding to the shape of the plurality of insulation sections.

BRIEF DESCRIPTION OF THE DRAWINGS/FIGURES

FIGS. 3A-3F are an illustration of a method of making an insulation panel according to an embodiment.

FIGS. 5A-5E are an illustration of a method of making an article of apparel according to an embodiment.

DETAILED DESCRIPTION OF THE INVENTION

Figure 1:
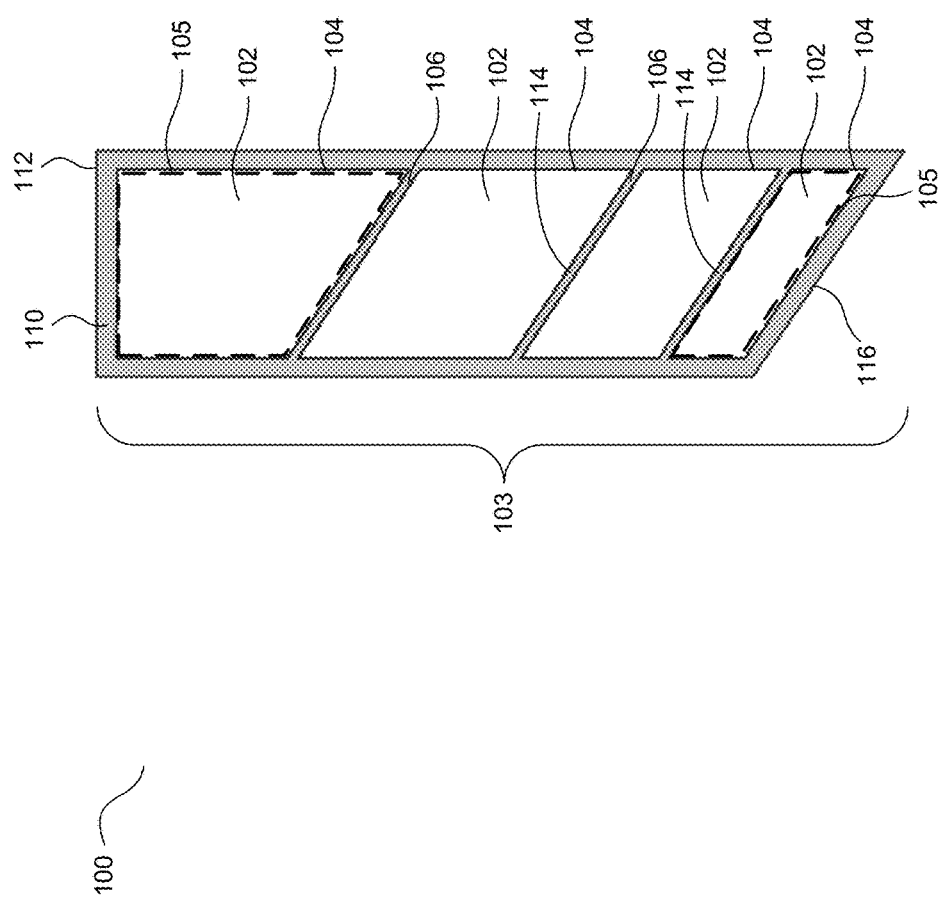
FIG. 1 is an insulation panel according to an embodiment.

The present invention(s) will now be described in detail with reference to embodiments thereof as illustrated in the accompanying drawings. References to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein, "disposed over" means that a second layer/material is deposited, formed, or placed over a first layer/material. The contact between the second layer/material and the first layer/material may be indirect (i.e., there may be other layers between the first and second layers/materials), unless it is specified that the first layer/material is "in contact with," "deposited on," or the like with respect to the second layer/material. For example, a second layer/material may be described as "disposed over" a first layer/material, even though there are various layers/materials in between the first layer/material and the second layer/material. Furthermore, if a second layer/material is "disposed over" a first layer/material, the second layer/material is formed, deposited, or placed after the first layer/material (i.e., the first layer/material is present before the second layer/material is disposed over it).

An article of apparel may shield a wearer from various environmental conditions, such as, wind, rain, and cold temperatures. In particular, the insulation of an article of apparel may protect and individual from cold temperatures. However, insulation also adds weight and volume to an article of apparel. Increased weight and/or volume may be undesirable in some instances, for example, for articles of apparel manufactured to be worn during athletic activities. Increased weight may be undesirable because it increases the weight an individual must carry during an athletic activity, which may make the athletic activity more difficult to perform. Increased volume may be undesirable because it may limit movement (e.g., arm or leg movement) and obstruct athletic maneuvers (e.g., dribbling, kicking, shooting, or throwing a ball), thus obstructing optimal athletic performance. Moreover, heavy and/or bulky apparel may be uncomfortable to wear, during athletic activities or leisurely activities.

Additionally, the aesthetic appeal of an article of apparel may be influenced by the apparel's insulation. In some instances, an individual may desire a non-bulky, slim-looking article of apparel. The insulation of an article of apparel may be configured to create a slim-looking article.

However, while lightweight, thinner, and/or slim articles of apparel may be appealing, it may also be desirable that an article of apparel provide the appropriate amount of insulative properties to keep an individual warm. The appropriate type and amount of insulation on article of apparel may provide desired insulative properties for an article of apparel. In some instances, lightweight and thinner insulation material may require superior insulation characteristics (i.e., heat conductivity) compared to its heavier and/or thicker counterparts to provide the same degree of insulative properties for an article of apparel.

In embodiments discussed herein, an article of apparel may include one or more encapsulated insulation panels. The encapsulated insulation panels may be lightweight and thin (e.g., approximately 1.5 mm thick). In some embodiments, insulation in the encapsulated insulation panels may include an aerogel material. The insulation may be divided into individual insulation sections that are coupled together and encapsulated between two thin polymeric films. The polymeric films may serve to separate and encapsulate the individual insulation sections, thereby protecting each of them from damage (e.g., mechanical damage, such as puncturing or tearing and/or water damage). Additionally, separately encapsulating individual insulation sections may isolate one or more insulation sections from damage affecting another insulation section (e.g., water damage to a single insulation section may be prevented from spreading to other insulation sections by separately encapsulating insulation sections).

In some embodiments, insulation sections within an encapsulated insulation panel may be aligned using a template to facilitate proper alignment and encapsulation of the insulation sections. In some embodiments, encapsulated insulation sections may be manufactured with a flat press (e.g., a press that applies only vertical pressures and does not move insulation sections during pressing) to prevent undesired shifting or misalignment of insulation sections. In some embodiments, encapsulated insulation panels may be coupled (e.g., bonded) to an article of apparel to provide desired insulative properties for the article of apparel. In some embodiments, encapsulated insulation panels may be coupled to directly to a fabric of a fully or partially completed article of apparel. In some embodiments, encapsulated insulation panels may be coupled to a fabric that is later used to form all or a portion of an article of apparel. In either case, encapsulated insulation panels may be coupled to the fabric so as to create an embossed fabric.

FIG. 1 shows an encapsulated insulation panel 100 according to an embodiment.

Encapsulated insulation panel 100 may include one or more insulation sections 102. Insulation sections 102 may comprise an insulation material, such as but not limited to, an aerogel material. In some embodiments, the aerogel material may include a fibrous sheet of aerogel material (e.g., Areotherm® insulation). In some embodiments, insulation sections 102 may be arranged in a spaced apart relationship with gaps 106 located between perimeter edges 104 of insulation sections 102. Perimeter edges 104 of each insulation section 102 define an outer perimeter 105 of each insulation section 102. In some embodiments, insulation sections 102 may have a thickness of approximately 1.5 mm. In some embodiments, insulation sections 102 may have a uniform thickness.

Insulation sections 102 may be coupled together and enclosed within an encapsulation 110. In some embodiments, encapsulation 110 may comprise one or more polymeric materials or layers (e.g., two polymeric films bonded together as discussed herein). In some embodiments, encapsulation 110 may include a sealed perimeter 112 disposed around a group 103 of insulation sections 102. In some embodiments, encapsulation 110 may include interior seals 114 located at gaps 106 between individual insulation sections 102 in group 103. In other words, sealed perimeter 112 and interior seals 114 may provide a sealed frame 116 that couples insulation sections 102 together, separates individual insulation section 102 from each other, and creates a seal around perimeter edges 104 of insulation sections 102. In some embodiments, encapsulation 110 may be waterproof.

Figure 2:
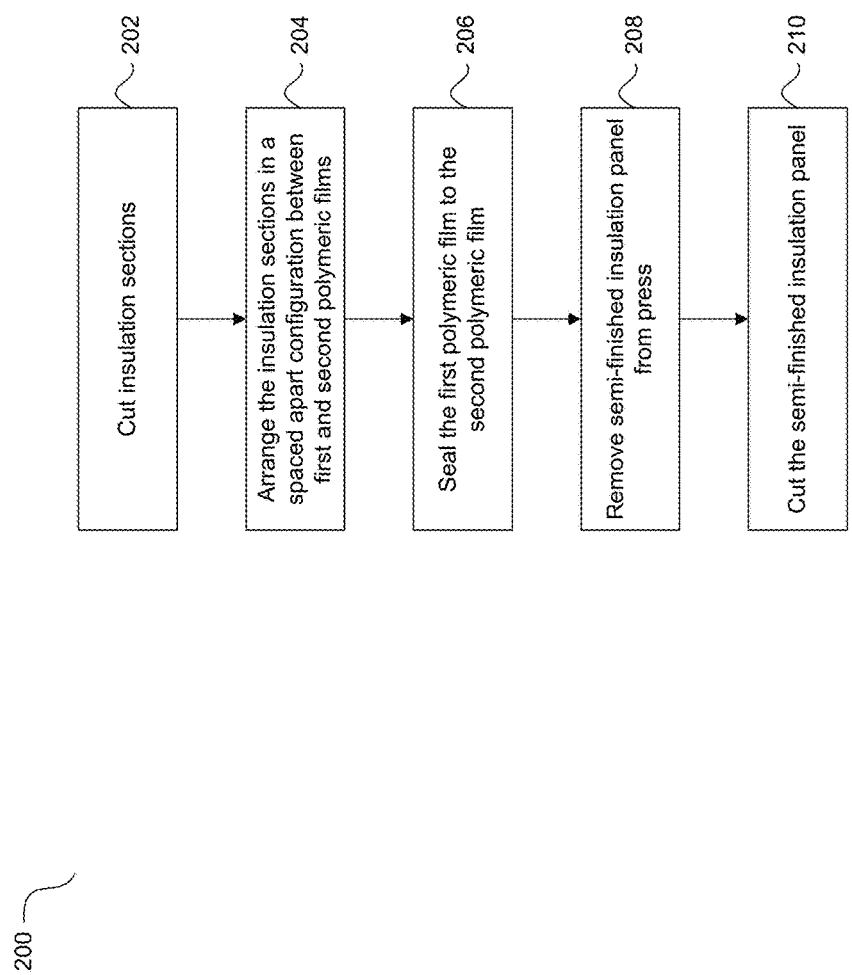
FIG. 2 is a flowchart illustrating a method of making an insulation panel according to an embodiment.

FIG. 2 shows a method 200 of making an encapsulated insulation panel 100 according to an embodiment. Although steps in method 200 may be described as a sequential process, some of the operations may in fact be performed in parallel or concurrently. In addition, in some embodiments, the order of operations may be rearranged without departing from the spirit of the disclosed subject matter. In step 202, a sheet of insulation material (e.g., a fibrous sheet of aerogel material, such as Areotherm® insulation) may be cut into individual insulation sections 102 (see e.g., FIG. 3A). Insulation sections 102 may be cut into any suitable shape, such as but not limited to, polygonal shapes (e.g., triangles, squares, rectangles, or hexagons), circles, and ovals). In step 202, individuals insulation sections 102 may be collected to form a group 103 of insulation sections 102. In some embodiments, one or more insulation sections 102 may have a different shape than other insulation sections 102 in a group 103 of insulation sections 102. In some embodiments, one or more insulation sections 102 in a group 103 may have the same shape, but different sizes (i.e., different sized outer perimeters 105). In some embodiments, each insulation section 102 in a group 103 may have the same shape and size.

In step 204, a group 103 of cut insulation sections 102 may be arranged in a spaced apart configuration between a first polymeric film 120 and a second polymeric film 122 (see e.g., FIG. 3B). Insulation sections 102 may be disposed over first polymeric film 120 in a spaced apart configuration and second polymeric film 122 may be disposed over insulation sections 102 such that insulation sections 102 are positioned between first polymeric film 120 and second polymeric film 122. In some embodiments, insulation sections 102 may be in direct contact with first polymeric film 120 and/or second polymeric film 122.

First polymeric film 120 and second polymeric film 122 may comprise a heat sealable polymeric material, such as but not limited to, polyurethane, low-density polyethylene, polypropylene, thermoplastic polyurethane, and blends or co-polymers thereof. In some embodiments, first polymeric film 120 and/or second polymeric film 122 may a thickness of approximately 75 microns. In some embodiments, first polymeric film 120 and/or second polymeric film 122 may have a melting point of approximately 145 degrees C.

In some embodiments, first polymeric film 120 and/or second polymeric film 122 may comprise an ether based thermoplastic polyurethane with a shore A hardness (measured using ASTMD2240) of greater than or equal to 84+/−2, a tear strength (N/cm, measured using a ISO (International Organization for Standardization) 3001:2001) of greater than or equal to MD (machine direction):1060, CD (cross direction):1070, a specific gravity (g/cm3, measured using ASTM D 1525) of greater than or equal to 1.20, a softening point of greater than or equal to 95 degrees C., a melting point of greater than or equal to 145 degrees C., a tensile elongation (%, measured using ISO 527-1:2012) of greater than or equal to MD:430, CD:430, and a tensile strength (N/mm2, measured using ISO 527-1:2013) of greater than or equal to MD:23.9, CD:23.8.

In some embodiments, a template 220 may be employed to arrange and align insulation sections 102 on first polymeric film 120 and second polymeric film 122 (or between first polymeric film 120 and second polymeric film). In some embodiments, template 220 may align insulation sections 102 on first polymeric film 120 and be removed before second polymeric film 122 is disposed over insulation sections 102. Template 220 may include one or more openings 222 corresponding to the shapes of the outer perimeters 105 of insulation sections 102 (i.e., exterior shapes of insulation sections 102). In other words, openings 222 may include inner perimeters 224 that substantially match outer perimeters 105 of insulation sections 102. In some embodiments, openings 222 may include inner perimeters 224 that substantially match outer perimeters 105 of insulation sections 102 in a group 103 of insulation sections 102. In some embodiments, openings 222 may define framework 226 corresponding to the shape of a sealed frame 116 of an encapsulated insulation panel 100.

In some embodiments, template 220 may serve to facilitate the creation of a seal between first polymeric film 120 and second polymeric film 122. In some embodiments, template 220 may be disposed over second polymeric film 122 in a press to facilitate the creation of a seal between first polymeric film 120 and second polymeric film 122. In some embodiments, template 220 may serve to facilitate the creation of a heat seal between first polymeric film 120 and second polymeric film 122, as discussed below in reference to step 206. In some embodiments, template 220 may comprise a metallic material, such as but not limited to, aluminum or steel.

In step 206, first polymeric film 120 may be sealed to second polymeric film 122 in a press 230 (see e.g., FIG. 3C). In some embodiments, press 230 may be a heat press and first polymeric film 120 may be heat sealed to second polymeric film 122 in press 230. In some embodiments, first polymeric film 120 may alternatively or additionally be sealed to second polymeric film 122 with an adhesive. In step 206, first polymeric film 120, second polymeric film 122, and template 220 may be disposed in a press 230 between a first press plate 232 and a second press plate 234.

In embodiments including heat sealing, press 230 may be a heat press and first press plate 232 and/or second press plate 234 may supply heat to seal first polymeric film 120 to second polymeric film 122. In some embodiments, heat may be conducted through template 220 to heat seal first polymeric film 120 to second polymeric film 122. In such embodiments, framework 226 of template 220 may facilitate creation of a heat-sealed border (e.g., sealed frame 116) around and in between insulation sections 102. In this manner, first polymeric film 120 and second polymeric film 122 may be heat sealed together between spaced apart insulation sections 102. In some embodiments, template 220 may be an integral part of press 230. For example, template 220 may be integrally formed on or coupled to first press plate 232 or second press plate 234. In such embodiments, insulation sections 102 may be aligned and arranged on/within press 230.

In some embodiments, first polymeric film 120 may be heat sealed to second polymeric film 122 at a temperature in the range of 125 degrees C. to 140 degrees C. In some embodiments, first polymeric film 120 may be heat sealed to second polymeric film 122 at a temperature in the range of 130 degrees C. to 135 degrees C. In some embodiments, press 230 may supply approximately 4.5 kgf/cm$^2$ (kilogram-force per square centimeter) of pressure when heat sealing first polymeric film 120 to second polymeric film 122. In some embodiments, heat sealing of first polymeric film 120 to second polymeric film 122 may be performed in approximately 45 seconds. These process parameters may vary depending on the material(s) comprising first polymeric film 120 and second polymeric film 122 and/or the thicknesses of the first polymeric film 120 and second polymeric film 122. In some embodiments, press 230 may be a flat press (i.e., a press that does not move insulation sections 102 during pressing and applies only vertical pressure with press plates 232/234 in a direction perpendicular to the thickness of insulation sections 102).

After first polymeric film 120 is sealed to second polymeric film 122 in step 206, insulation sections 102, first polymeric film 120, and second polymeric film 122 may be removed from press 230 in step 208 (see e.g., FIG. 3D). In some embodiments, insulation sections 102, first polymeric film 120, and second polymeric film 122 may be cooled on a cooling table for approximately 10 seconds before step 210.

In some embodiments, as shown for example in FIG. 2, steps 202-208 may produce a semi-finished encapsulated insulation panel 240. In such embodiments, semi-finished encapsulated insulation panel 240 may be cut to remove excess material (e.g., excess portions of first polymeric film 120 and/or second polymeric film 122 around the perimeter of encapsulated insulation panel 100) in step 210 (see e.g., FIG. 3E). Is some embodiments, semi-finished encapsulated insulation panel 240 may be cut using a cutting tool 250 (e.g., a die cutting tool). Is some embodiments, semi-finished encapsulated insulation panel 240 may be laser cut. After semi-finished encapsulation insulation panel 240 is cut to remove excess material in step 210, a finished encapsulated insulation panel 100 is produced (see e.g., FIG. 3F). In some embodiments, step 210 may be eliminated by precisely measuring and positioning insulation sections 102, first polymeric film 120, and second polymeric film 122 in press 230. In some embodiments, press 230 may be configured to cut excess material from first polymeric film 120 and/or second polymeric film 122 before or after sealing first polymeric film 120 to second polymeric film 122.

While FIG. 2 shows the production of a single encapsulated insulation panel 100, method 200 may produce a plurality of encapsulated insulation panels 100. For example, two or more groups 103 of insulation sections 102 may be arranged in spaced apart configurations between first polymeric film 120 and second polymeric film 122 in step 204. In such embodiments, a plurality of templates 220 may be employed to arrange and align groups 103 of insulation sections 102. Subsequently, first polymeric film 120 and second polymeric film 122 may be sealed around and in between insulation sections 102 and groups 103 of insulation sections 102, thereby creating a semi-finished encapsulated insulation panel including a plurality of encapsulated insulation panels 100 coupled together. Then, in step 210, individual encapsulated insulation panels 100 may be cut from the semi-finished encapsulated insulation panel.

Figure 4:
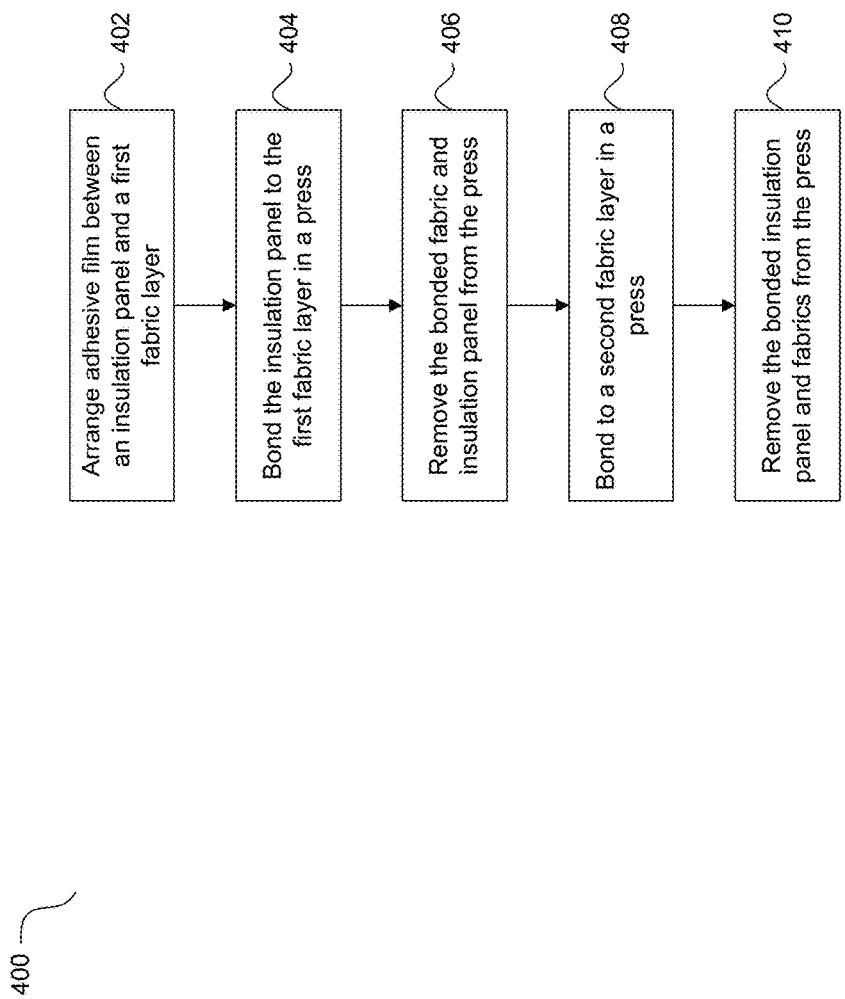
FIG. 4 is a flowchart illustrating a method of making an article of apparel according to an embodiment.

FIG. 4 shows a method 400 of making an article of apparel including one or more encapsulated insulation panels 100 according to an embodiment. Although steps in method 400 may be described as a sequential process, some of the operations may in fact be performed in parallel or concurrently. In addition, in some embodiments, the order of operations may be rearranged without departing from the spirit of the disclosed subject matter. In step 402, an adhesive film 450 may be arranged between an encapsulated insulation panel 100 and a first fabric layer 460 (see e.g., FIG. 5A). First fabric layer 460 may be woven, nonwoven, or knitted and may be made of one or more suitable textile materials (i.e., fabric material) including, but not limited to, nylon, polyester, polyamide, polyolefin, acrylic, expanded polytetrafluorethylene (ePTFE), cotton, silk, elastane, wool, any combination, blend, or recycled version of the same.

In some embodiments, adhesive film 450 may include a plurality of openings 452. Openings 452 may have shapes corresponding to the shapes of the outer perimeters 105 of insulation sections 102 in a group 103 of insulation sections 102 (i.e., exterior shapes of insulation sections 102). In other words, openings 452 may include inner perimeters 454 that substantially match outer perimeters 105 of insulation sections 102. Openings 452 in adhesive film 450 may define a framework 456 having a shape corresponding to the shape of a sealed border (e.g., sealed frame 116) around and in between insulation sections 102 of an encapsulated insulation panel 100. In some embodiments, adhesive film 450 with openings 452 may be cut (e.g., laser cut) from a stock sheet of adhesive film. In some embodiments, openings 452 may be formed by arranging strips of adhesive film to form framework 456 having openings 452.

In some embodiments, adhesive film 450 may be a double-sided adhesive film. In some embodiments, adhesive film 450 may be a heat seal film. In some embodiments, adhesive film 450 may be an adhesive film manufactured by Bemis Company, Inc.

After arranging adhesive film 450 between encapsulated insulation panel 100 and first fabric layer 460, encapsulated insulation panel 100 and first fabric layer 460 may be bonded together in step 404 (see e.g., FIG. 5B). In some embodiments, encapsulated insulation panel 100 and first fabric layer 460 may be bonded together using a press 470 (e.g., pressed together to bond encapsulated insulation panel 100 and first fabric layer 460). Press 470 may apply one or more types of pressure to bond encapsulated insulation panel 100 and first fabric layer 460. Types of pressure press 470 may apply include, but are not limited to, mechanical pressure (e.g., pressing encapsulated insulation panel 100 and first fabric layer 460 between two press plates) and vacuum pressure (e.g., pulling a vacuum between two non-air-permeable layers positioned on opposite sides of an assembled encapsulated insulation panel 100 and first fabric layer 460 (see e.g., polymeric pad 602 and polymeric sheet 610 in FIG. 6)). Press 470 may be the same as or similar to press 230. In some embodiments, press 470 may be a heat press. In some embodiments a template the same as or similar to template 220 may be used in conjunction with press 470 to bond encapsulated insulation panel 100 to first fabric layer 460. After bonding, encapsulated insulation panel 100 and first fabric layer 460 may be removed from press 470 in step 406 (see e.g., FIG. 5C).

In some embodiments, the bonding of encapsulated insulation panel 100 to first fabric layer 460 may create an embossed fabric 480 (e.g., a fabric having an outer surface conforming to the shape of insulation sections 102). In some embodiments, the creation of embossed fabric 480 may be facilitated by adhesive film 450 having openings 452 defining framework 456. Framework 456 may result in encapsulated insulation panel 100 being bonded to first fabric layer 460 only at locations corresponding to sealed frame 116 in order to create embossed fabric 480. In some embodiments, the creation of embossed fabric may be facilitated by the application of pressure in press 470 (e.g., by pulling a vacuum and/or by applying mechanical pressure on a template within press 470).

Once encapsulated insulation panel 100 is bonded to first fabric layer 460, the side of encapsulated insulation panel 100 opposite the side bonded to first fabric layer 460 may be coupled to a second fabric layer in step 408 (see e.g., FIG. 5D). In some embodiments, this may be accomplished by coupling a second fabric layer to first fabric layer 460. In some embodiments, the second fabric layer may be bonded to first fabric layer 460. In some embodiments, encapsulated insulation panel 100 may be alternatively or additionally coupled (e.g., bonded) to the second fabric layer.

In step 408, encapsulated insulation panel 100 and the second fabric may be disposed in a press (e.g., press 470) where pressure and/or heat is applied to couple encapsulated insulation panel 100 and the second fabric together (e.g., by bonding first fabric layer 460 to the second fabric layer). In some embodiments, first fabric layer 460 may be bonded to the second fabric layer with an adhesive tape 492 disposed over a perimeter of the second fabric layer such that it overlaps first fabric layer 460 and the second fabric layer. In some embodiments, adhesive tape 492 may be disposed over an outer perimeter (e.g., sealed perimeter 112) of encapsulated insulation panel 100. In some embodiments, adhesive tape 492 may be silicone rubber tape. In some embodiments, adhesive tape 492 may be heat sealing tape. Similar to first fabric layer 460, the second fabric layer may be woven, nonwoven or knitted and may be made of one or more suitable textile materials (i.e., fabric material) including, but not limited to, nylon, polyester, polyamide, polyolefin, acrylic, expanded polytetrafluorethylene (ePTFE), cotton, silk, elastane, wool, any combination, blend, or recycled version of the same.

The coupling of encapsulated insulation panel 100 and the second fabric layer in step 408 may create a multilayer fabric 490. Once bonded, multilayer fabric 490 may be removed from press 470 in step 410 (see e.g., FIG. 5E). In some embodiments, multilayer fabric 490 may be formed on a fully or partially completed article of apparel (e.g., first fabric layer 460 or the second fabric layer may be part of a fully or partially completed article of apparel). In some embodiments, multilayer fabric 490 may be a fabric sheet used to form all or a portion of an article of apparel. For example, fabric sheet(s) 806 appropriately dimensioned for portions (e.g., sleeves, body, or collar) of jacket 800 shown in FIGS. 8 and 9 may be cut from multilayer fabric 490. In such embodiments, appropriate cutting and coupling of fabric sheet(s) 806 along seams 808 may serve to properly position encapsulated insulation panels 100 on jacket 800 (or other types of apparel).

Figure 6:
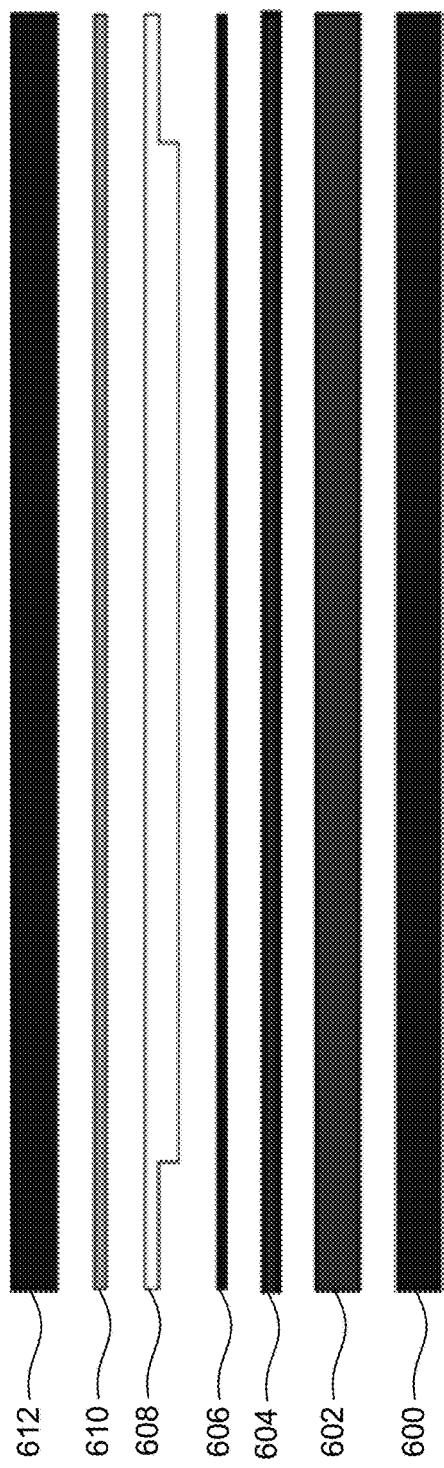
FIG. 6 is an exploded view of layers that may be used to bond an encapsulated insulation panel to a fabric layer according to an embodiment.

FIG. 6 shows an exploded view of various layers that may be disposed in a press (e.g., press 470) when bonding encapsulated insulation panel 100 to first fabric layer 460 in step 404 according to an embodiment. As shown in FIG. 6, a polymeric pad 602 may be disposed over a first press plate 600 of a press. In some embodiments, polymeric pad 602 may be in direct contact with first press plate 600. In some embodiments, polymeric pad 602 may be a silicone pad. A first fabric layer 604 may be disposed over polymeric pad 602. In some embodiments, first fabric layer 604 may be in direct contact with polymeric pad 602. First fabric layer 604 may be the same as or similar to first fabric layer 460.

An adhesive film 606, which may be the same as or similar to adhesive film 450 may be disposed over first fabric layer 604. In some embodiments, adhesive film 606 may be in direct contact with first fabric layer 604. An encapsulated insulation panel 608 including one or more insulation sections (e.g., insulation panel 100) may be disposed over adhesive film 606. In some embodiments, encapsulated insulation panel 608 may be in direct contact with adhesive film 606. A polymeric sheet 610 may be disposed over encapsulated insulation panel 608. In some embodiments, polymeric sheet 610 may be in direct contact with encapsulated insulation panel 608 and/or a second press plate 612 of a press. In some embodiments, polymeric sheet 610 may be a Teflon sheet.

Once polymeric pad 602, first fabric layer 604, adhesive film 606, encapsulated insulation panel 608, and polymeric sheet 610 are assembled between second press plate 612 and first press plate 600, pressure may be applied the assembled layers to bond first fabric layer 604 to encapsulated insulation panel 608 (e.g., as described above in regards to step 404). In embodiments including an adhesive film 606 that includes a heat seal film, bonding encapsulated insulation panel 608 to first fabric layer 604 may include applying heat to heat seal encapsulated insulation panel 608 to first fabric layer 604 with adhesive film 606.

Figure 7:
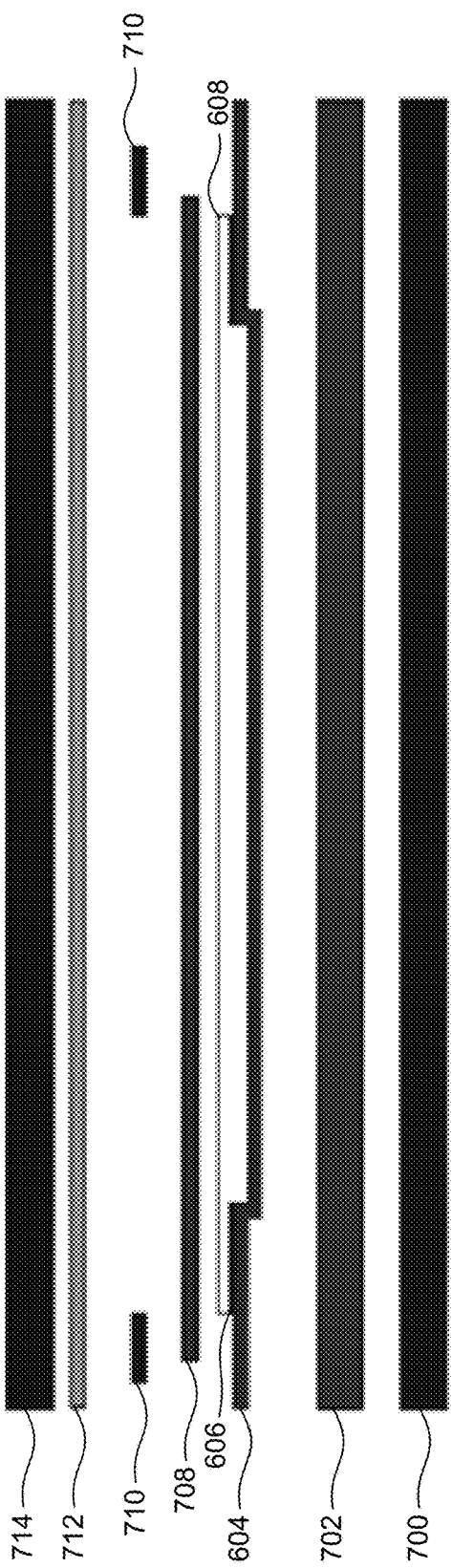
FIG. 7 is an exploded view of layers that may be used to couple a fabric layer to an encapsulated insulation panel according to an embodiment.

FIG. 7 shows an exploded view of various layers that may be disposed in a press (e.g., press 470) when coupling encapsulated insulation panel 100 to a second fabric layer in step 408 according to an embodiment. As shown in FIG. 7, a polymeric pad 702 may be disposed over a first press plate 700 of a press. In some embodiments, polymeric pad 702 may be in direct contact with first press plate 700. In some embodiments, polymeric pad 702 may be a silicone pad. Encapsulated insulation panel 608 bonded to first fabric layer 604 may be disposed over the polymeric pad 702. In some embodiments, first fabric layer 604 may be in direct contact with polymeric pad 702.

A second fabric layer 708 may be disposed over encapsulated insulation panel 608 bonded to first fabric layer 604. In some embodiments, second fabric layer 708 may be in direct contact with encapsulated insulation panel 608 and/or first fabric layer 604. Once second fabric layer 708 is disposed over encapsulated insulation panel 608 bonded to first fabric layer 604, adhesive tape 710, the same as or similar to adhesive tape 492, may be disposed over a perimeter of second fabric layer 708 such that adhesive tape 710 overlaps first fabric layer 604 and second fabric layer 708. In some embodiments, adhesive tape 710 may be in direct contact with first fabric layer 604 and second fabric layer 708. In some embodiments, adhesive tape 710 may be disposed over second fabric layer 708 such that adhesive tape 710 overlaps and is disposed over an outer perimeter (e.g., sealed perimeter 112) of encapsulated insulation panel 608. A polymeric sheet 712 may be disposed over second fabric layer 708 and adhesive tape 710. In some embodiments, polymeric sheet 712 may be in direct contact with adhesive tape 710, second fabric layer 708, and/or a second press plate 714.

Once polymeric pad 702, encapsulated insulation panel 608 bonded to first fabric layer 604, second fabric layer 708, adhesive tape 710, and polymeric sheet 712 are arranged between second press plate 714 and first press plate 700, pressure may be applied the assembled layers to bond second fabric layer 708 to first fabric layer 604. For example, mechanical pressure may be applied to first press plate 700 and/or second press plate 714 (e.g., as described above in regards to step 408). In embodiments including an adhesive tape 710 that includes a heat sealing tape, bonding second fabric layer 708 to first fabric layer 604 may include applying heat to heat seal second fabric layer 708 to first fabric layer 604 with adhesive tape 710.

Figure 8:
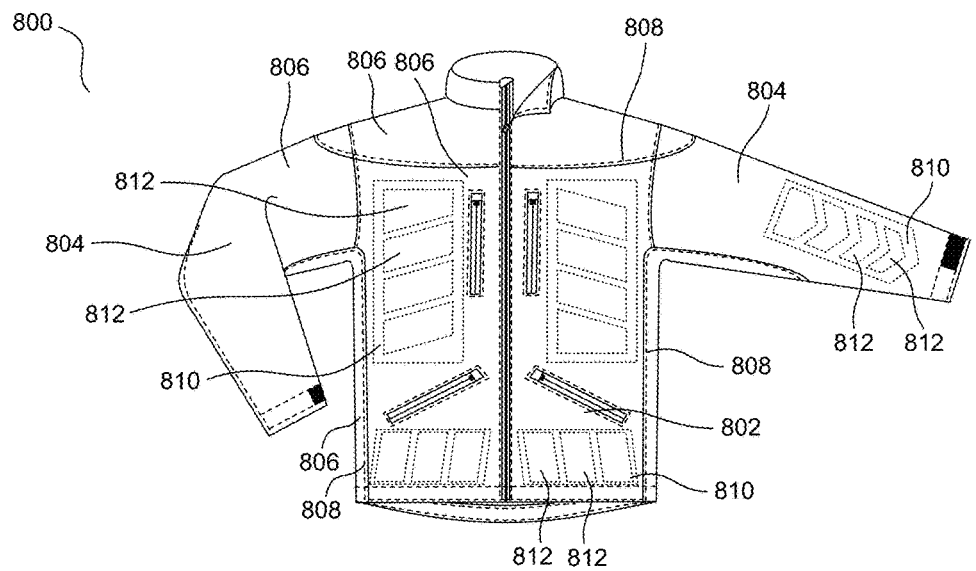
FIGS. 8 and 9 are front and back views of an article of apparel according to an embodiment.
Figure 9:
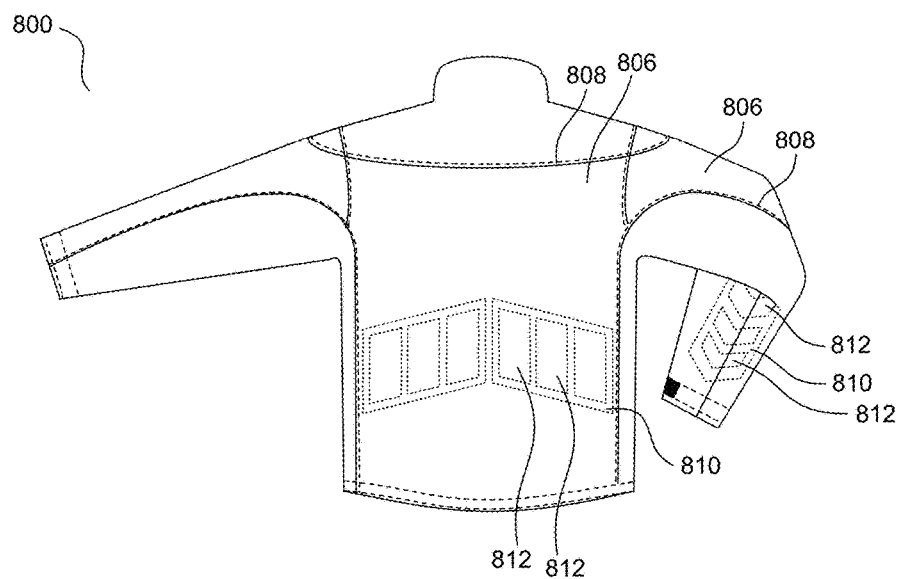

FIGS. 8 and 9 show front and back views of an article of apparel (jacket 800) according to an embodiment. Jacket 800 includes two sleeves 802 coupled to a jacket body 804. In some embodiments, jacket 800 may be composed of a plurality of fabric sheets 806 appropriately dimensioned to form portions (e.g., all or part of a sleeve 802, or all or part of jacket body 804) of jacket 800. Fabric sheets 806 may be coupled together at seams 808 to form jacket 800. Fabric sheets 806 may be coupled together at seams 808 via, for example but not limited to, stitching and/or an adhesive.

As shown in FIGS. 8 and 9, jacket 800 includes a plurality of encapsulated insulation panels 810 including a plurality of insulation sections 812 disposed in a spaced apart configuration positioned at one or more locations on jacket 800. Encapsulated insulation panels 810 may be the same as or similar to encapsulated insulation panels 100. In some embodiments, locations on jacket 800 corresponding to the location of insulation panels 810 may be embossed (i.e., may be embossed fabric) such that the shape of insulation sections 812 are visible to an individual looking at jacket 800.

Encapsulated insulation panels 810 on jacket 800 may have various sizes and shapes. The size and shape of an encapsulated insulation panel 810 may depend on its location on jacket 800. For example, encapsulated insulation panels 810 on sleeves 802 of jacket 800 may be smaller than some encapsulated insulation panels 810 located on body 804 of jacket 800. Similarly, insulation sections 812 may have different sizes and/or shapes, which may depend on the location of insulation sections 812 on jacket 800. In some embodiments, encapsulated insulation panels 810 may be arranged on jacket 800 to provide targeted insulation for specific areas of a wearer's body. In some embodiments, the size and shape of encapsulated insulation panels 810 and/or insulation sections 812 may provide targeted insulation.

While FIGS. 8 and 9 show a jacket 800 as an exemplary article of apparel, any article of apparel, or a portion thereof, may be manufactured with the encapsulated insulation panels discussed herein. Such articles of apparel may be, but are not limited to, pants, shorts, leggings, a sock, a shirt, a coat, a hat, a sleeve, a shoe, a sweater, a jersey, and a glove.

It is to be appreciated that the Detailed Description section, and not the Summary and Abstract sections, is intended to be used to interpret the claims. The Summary and Abstract sections may set forth one or more but not all exemplary embodiments of the present invention(s) as contemplated by the inventor(s), and thus, are not intended to limit the present invention(s) and the appended claims in any way.

The present invention(s) has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention(s) that others can, by applying knowledge within the skill of the art, readily modify and/or adapt for various applications such specific embodiments, without undue experimentation, without departing from the general concept of the present invention(s). Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention(s) should not be limited by any of the above-described exemplary embodiments, but should be defined only in accordance with the following claims and their equivalents.

What is claimed is:

1. An article of apparel, comprising:
    an encapsulated insulation panel comprising a plurality of insulation sections in a spaced apart configuration and encapsulated between two polymeric films, each insulation section comprising an aerogel material;
    a first fabric layer bonded to a first side of the encapsulated insulation panel with an adhesive film comprising a plurality of openings corresponding to exterior shapes of the plurality of insulation sections; and
    a second fabric layer coupled to a second side of the encapsulated insulation panel,
    wherein the first fabric layer comprises an embossed exterior surface corresponding to a shape of the plurality of insulation sections.

2. The article of apparel of claim 1, wherein the aerogel material comprises a fibrous sheet of aerogel material.

3. The article of apparel of claim 1, wherein the encapsulated insulation panel is waterproof.

4. The article of apparel of claim 1, wherein at least one of the two polymeric films comprises a thermoplastic material.

5. The article of apparel of claim 1, wherein the two polymeric films comprise a first polymeric film heat sealed to a second polymeric film.

6. The article of apparel of claim 5, wherein the first polymeric film is heat sealed to the second polymeric film between two adjacent spaced apart insulation sections.

7. The article of apparel of claim 5, wherein the first polymeric film is heat sealed to the second polymeric film around a perimeter of at least one of the plurality of insulation sections.

8. The article of apparel of claim 5, wherein the plurality of spaced apart insulation sections are arranged in a group, and wherein the first polymeric film is heat sealed to the second polymeric film around a perimeter of the group of spaced apart insulation sections.

9. The article of apparel of claim 1, wherein the two polymeric films comprise a first polymeric film bonded to a second polymeric film.

10. The article of apparel of claim 9, wherein the first polymeric film is bonded to the second polymeric film between two adjacent spaced apart insulations sections.

11. The article of apparel of claim 1, wherein the second fabric layer is adhesively bonded to the second side of the encapsulated insulation panel.

12. The article of apparel of claim 1, wherein the embossed exterior surface of the first fabric layer is visible to an individual looking at the article of apparel.

13. An article of apparel, comprising:
an encapsulated insulation panel comprising an insulation section encapsulated between two polymeric films, the insulation section comprising an insulation material;
a first fabric layer bonded to a first side of the encapsulated insulation panel with an adhesive film comprising an opening corresponding to an exterior shape of the insulation section; and
a second fabric layer coupled to a second side of the encapsulated insulation panel,
wherein the first fabric layer comprises an embossed exterior surface corresponding to a shape of the insulation section.

14. The article of apparel of claim 13, wherein the insulation material comprises an aerogel material.

15. The article of apparel of claim 13, wherein the encapsulated insulation panel comprises a plurality of insulation sections encapsulated between the two polymeric films, and
wherein the embossed exterior surface of the first fabric layer comprises a surface corresponding to a shape of the plurality of insulation sections.

16. The article of apparel of claim 13, wherein the two polymeric films comprise a first polymeric film heat sealed to a second polymeric film.

17. An article of apparel, comprising:
a body;
two sleeves extending from the body;
a first encapsulated insulation panel located on one of the sleeves and comprising:
a plurality of first insulation sections in a spaced apart configuration and encapsulated between a first polymeric film and a second polymeric film, each first insulation section comprising an insulation material;
a second encapsulated insulation panel located on the body and comprising:
a plurality of second insulation sections in a spaced apart configuration and encapsulated between a third polymeric film and a fourth polymeric film, each second insulation section comprising an insulation material;
a first fabric layer bonded to a first side of the first encapsulated insulation panel and a first side of the second encapsulated insulation panel;
a second fabric layer coupled to a second side of the first encapsulated insulation panel; and
a third fabric layer coupled to a second side of the second encapsulated insulation panel,
wherein the first fabric layer comprises an embossed exterior surface comprising a first embossed area corresponding to a shape of the plurality of first insulation sections and a second embossed area corresponding to a shape of the plurality of second insulation sections, and
wherein the embossed exterior surface of the first fabric layer is visible to an individual looking at the article of apparel.

18. The article of apparel of claim 17, wherein the insulation material of the first insulation sections and the insulation material of the second insulation sections comprises an aerogel material.

19. The article of apparel of claim 17, wherein the first fabric layer is bonded to the first side of the first encapsulated insulation panel with a first adhesive film comprising a plurality of openings corresponding to exterior shapes of the plurality of first insulation sections, and
wherein the first fabric layer is bonded to the first side of the second encapsulated insulation panel with a second adhesive film comprising a plurality of openings corresponding to exterior shapes of the plurality of second insulation sections.

20. The article of apparel of claim 17, wherein the first fabric layer comprises a plurality of fabric sheets coupled together at one or more seams.

* * * * *